US005350162A

United States Patent [19]

Cushing

[11] Patent Number: 5,350,162

[45] Date of Patent: Sep. 27, 1994

[54] APPARATUS FOR ASSEMBLING REINFORCING BAR PIER CAGES

[76] Inventor: Meredith K. Cushing, 3327 Makyes Rd., Nedrow, N.Y. 13120

[21] Appl. No.: 27,650

[22] Filed: Mar. 8, 1993

[51] Int. Cl.$^5$ .................................... B23P 19/00

[52] U.S. Cl. .................................... 269/13; 269/41; 269/43; 269/45; 269/82; 269/909; 29/281.3

[58] Field of Search .................... 269/41, 43, 45, 910, 269/909, 74, 76, 81, 82, 13; 29/281.3, 467

[56] References Cited

U.S. PATENT DOCUMENTS

| | | | |
|---|---|---|---|
| 568,543 | 9/1896 | Parks | 269/45 |
| 2,662,565 | 12/1953 | Le Vay . | |
| 2,811,186 | 10/1957 | Honza | 269/910 |
| 2,958,351 | 11/1960 | Deamer et al. . | |
| 3,241,585 | 3/1966 | Jureit | 269/45 |
| 3,299,920 | 1/1967 | Koenigshof | 269/45 |
| 3,861,096 | 1/1973 | Emmons . | |
| 4,073,112 | 2/1978 | Leiblich . | |
| 4,154,436 | 5/1979 | Sellers | 269/910 |
| 4,922,598 | 5/1990 | Pouyer . | |
| 5,234,204 | 8/1993 | Hunt | 269/43 |

*Primary Examiner*—Robert C. Watson

*Attorney, Agent, or Firm*—Katherine McGuire

[57] ABSTRACT

A jig for assembling a rebar pier cage wherein certain of the individual jig elements are laterally and longitudinally adjustable to provide a jig capable of assembling rebar pier cages of various sizes and shapes. The jig elements comprise a plurality of rebar stirrup retaining elements removably secured within longitudinal openings in first and second, elongated channel bars which traverse a rectangular work surface in parallel relationship. Opposite ends of the first and second channel bars are slidingly secured within longitudinal openings of third and fourth channel bars which laterally span the opposite, shorter edges of the work surface. Means are provided to adjust the longitudinal spacing between each stirrup retaining element in the first and second channel bars, and also the lateral spacing between the first and second channel bars. The work surface is pivotally connected to a table frame whereby the work surface may be moved between horizontal and vertical positions with respect to the table frame and floor.

15 Claims, 3 Drawing Sheets

APPARATUS FOR ASSEMBLING REINFORCING BAR PIER CAGES

BACKGROUND OF THE INVENTION

The present invention generally relates to assembly jigs and, more particularly, to a novel and unique method and jig used in the assembling of reinforcing bar pier cages typically used in the construction art to reinforce concrete piers, caissons, pilasters and the like. Moreover, the present invention provides a jig utilizing a mobile and pivotable framework.

Traditionally, the assembling of reinforcing bar (abbreviated "rebar" in the art) grids and pier cages from individual lengths of rebar is time consuming, physically demanding work. For assembling a rebar pier cage, at least two sawhorses are used upon which the pier cage is assembled. A typical rebar pier cage is of rectangular configuration and comprises at least four elongated rebars and a plurality of longitudinally spaced, rectangular or square formed rebars (termed "stirrups" in the art). Thus, four elongated, steel rebars which comprise the vertical supports of the pier cage are laid across the sawhorses parallel to each other and sequentially marked with chalk at the positions where the stirrups are to be positioned. The stirrups are placed in encircling relation around two of the vertical rods which are positioned at and abut adjacent corners of the stirrups. The stirrups are secured to the elongated rebars with appropriate tie clasps with each stirrup lying in equally longitudinally spaced, parallel planes which are perpendicular to the axes of the elongated rebars. The remaining two elongated rebars are then extended through each of the stirrups in longitudinal succession and positioned at and abut the remaining two corners thereof. The stirrups are then secured with tie clasps to the remaining two rebars, thereby completing the rebar pier cage which is substantially rectangular in shape.

The physical and temporal demands of assembling a rebar pier cage vary directly with the overall dimensions of the cage, i.e., the larger the cage, the longer it takes to complete, and the heavier and bulkier it is to move about. No other methods of assembling rebar piers, which ease both the physical and temporal demands on a worker, are known to the applicant.

It is therefore a principal object of the present invention to provide a method and apparatus for assembling reinforcing bar pier cages, and the like, which substantially reduces the physical and temporal demands of an assembly worker over previously known assembly methods and apparatus.

It is an additional object of the present invention to provide an assembly jig for rebar pier cages which is mobile and easy to use.

It is a further object of the present invention to provide an assembly jig for rebar pier cages which substantially eliminates the need for the completed pier cage to be manually lifted from the horizontal assembly position to a vertical standing position.

It is yet another object of the present invention to provide an assembly jig for rebar pier cages which facilitates the layout and tying of pier cages by providing an assembly work area which is substantially between the waist and chest levels of the assembly worker(s).

It is an additional object of the present invention to provide an assembly jig for rebar pier cages capable of constructing rebar pier cages of varying shapes and sizes.

It is a further object of the present invention to provide an assembly jig for rebar pier cages which substantially reduces the labor cost of assembling pier cages over traditional methods.

Other objects will in part be obvious and in part appear hereinafter.

SUMMARY OF THE INVENTION

In accordance with the foregoing objects, the present invention provides a mobile jig used in the assembling of reinforcing bar pier cages, and the like. The assembly jig is generally comprised of a mobile table frame having a pivotally mounted work surface attached thereto, with various jig elements mounted atop the pivotal work surface. Portions of the jig are slidably positionable with respect to one another, thereby providing a jig capable of constructing rebar pier cages of many different sizes and shapes.

A fully assembled rebar pier cage comprises a plurality of rebars which are bent into usually symmetrical, polygonal configuration (commonly termed "stirrups" in the aft), and a plurality of elongated rebars attached to the stirrups at the inside surfaces thereof, thereby defining an elongated, polygonal structure. The stirrups are laterally spaced from one another along the elongated rebars a predetermined distance apart with the spacing determined by the amount of reinforcing necessary to give the end product (i.e., concrete pier, pilaster, etc. ) its desired strength.

The table frame upon which the jig elements and work surface are mounted includes four legs which are interconnected to one another by upper and lower, horizontally extending support bars with the upper set being positioned adjacent the top ends of the legs opposite the floor, and the lower set being positioned adjacent the bottom ends of the legs near the floor. At least two of the legs further include floor engaging casters making the entire apparatus mobile.

The pivotal work surface is hingedly connected to the table frame and is of a length approximately equal to the sum of the length and height of the table frame with the smaller edges of the table and work surface on one side thereof being flush with one another. The hinges which connect the work surface to the table frame are positioned at the juncture of the opposite edge of the table frame where the work surface extends beyond the table frame. The hinged connections permit the work surface to be manually movable between a first horizontal position and a second vertical position with respect to the table frame. The work surface is moved into the horizontal position for assembling a rebar pier cage and when finished, is moved to the vertical position whereupon the finished pier cage may be easily removed therefrom into a vertical standing position.

The jig elements with which a pier cage is assembled comprises four elongated, channel bars and a plurality of stirrup retaining elements slidingly positioned within the two longest, parallel bars. Each of the channel bars are hollow and of square cross-section including a longitudinal opening extending substantially the entire length in the upwardly facing surfaces thereof. The openings extend through the bars to the hollow interiors thereof, thereby defining channels in which the retaining elements are slidingly positioned.

The two shorter channel bars are of a length substantially equal to the width of the table work surface and are fixedly mounted thereto adjacent and traversing the opposite, shorter ends of the rectangular work surface. The two longest channel bars are of a length substantially equal to the length of the work surface with the opposite ends thereof being slidably mounted within the openings of the shorter channel bars. The two longest bars thereby longitudinally traverse the work surface in parallel, spaced relation to one another with the lateral spacing between the bars being selectively adjustable by moving the opposite ends thereof within the channel openings of the shorter channel bars.

A rectangular shaped opening is formed in each of the two longest channel bars on the upwardly facing surface thereof for inserting the fastening element which attaches to the lower portion of each of the stirrup retaining elements. The fastening element is manually operable to releasably secure its respective stirrup retaining element within the channel bars. The stirrup retaining elements comprise sheet steel formed into an elongated, squared U shape having first and second legs lying in spaced, parallel planes to one another. An equal plurality of stirrup retaining elements are positioned within the channels of each of the two longest channel bars and are equally longitudinally spaced therealong with the stirrup retaining elements extending upwardly in a direction away and perpendicular to the work surface.

To assemble a rebar pier cage using the present invention, the work surface is placed in its horizontal position. A predetermined number of stirrup retaining elements are placed within the channels of the two longest channel bars and spaced a predetermined distance from one another with each stirrup retaining element in one channel bar being in lateral alignment with a respective stirrup retaining element in the other channel bar. Furthermore, each stirrup retaining element is oriented with its laterally extending opening between each leg thereof being aligned with the laterally extending opening of the laterally aligned stirrup retaining element. A stirrup is placed within the laterally extending openings of each pair of laterally aligned stirrup retaining elements such that the stirrups lie in spaced, parallel planes to one another, which planes lie perpendicular to the planar work surface. The elongated rebars are inserted through each of the stirrups in longitudinal succession and are placed at predetermined locations abutting the inside surfaces thereof. The elongated rods are secured to the stirrups at each juncture of the elongated rods and the stirrup, with metal tie bands, or the like. The work surface may then be pivoted to its vertical position to allow the pier cage to be easily removed from the stirrup retaining elements to a vertical, standing position.

DETAILED DESCRIPTION

Figure 1:
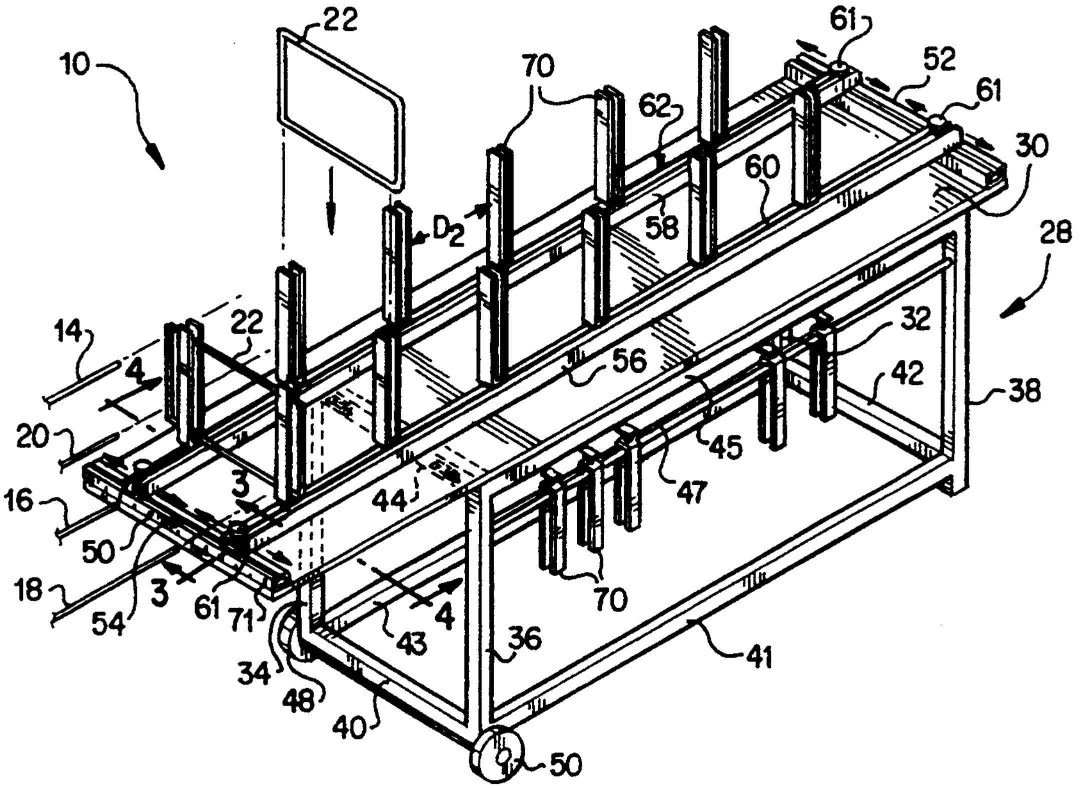
FIG. 1 is a perspective view of the rebar pier cage jig showing proper placement of two stirrups and four elongated rebars (fragmented) used in assembling a reinforcing bar pier cage therewith.
Figure 2:
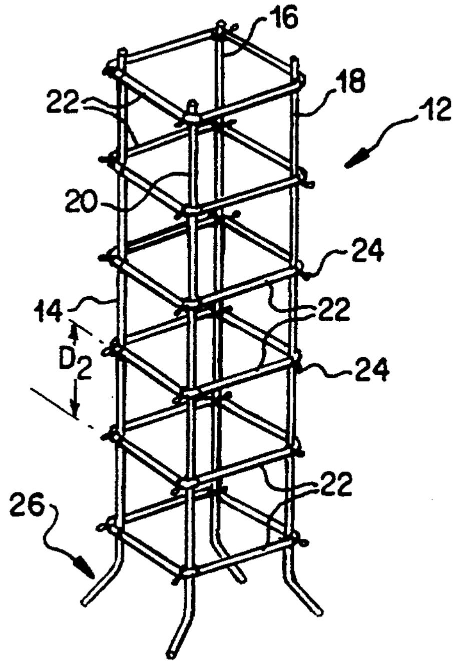
FIG. 2 is a perspective view of a fully assembled reinforcing bar pier cage.

Referring to FIG. 1, there is seen the inventive jig 10 which is used to easily and quickly assemble rebar pier cages such as cage 12 seen in FIG. 2. Rebar pier cages are commonly constructed and used in the construction art to reinforce concrete piers and pilasters. Cage 12 is seen to be generally rectilinear in shape, comprising four elongated rebars 14, 16, 18 and 20 secured in parallel, spaced relation by a plurality of rectangular shaped rebars 22 typically termed "stirrups" in the art. As seen, the elongated rebars 14, 16, 18 and 20 are abutted against a respective, inner corner of each stirrup 22, and secured thereto with a metal tie band 24 or the equivalent. Also, the ends of the elongated rebars may be flared outwardly such as at 26 where the concrete footing is poured. It is noted that rectangular cage 12 is a common configuration for a pier cage, however, it is understood that the present invention may be used to assemble pier cages of various shapes, sizes and dimensions and that the rectangular pier cage 12 is used herein merely for purposes of description.

Referring back to FIG. 1, jig 10 is seen to generally comprise a work table having a legged frame 28 supporting a horizontal, planar work surface 30. Various jig elements are secured to work surface 30 to be described in detail below. Legged frame 28 is seen to include four vertical legs 32, 34, 36 and 38 interconnected by upper and lower, horizontally extending support bars 40–43, and 44–47, respectively (two of the upper support bars (46, 47) not shown in the drawing figures). Casters 48 and 50 are provided at what is considered the "front" of the jig 10 allowing transportation of jig 10 about a work site as needed. This would simply involve lifting and pushing and/or pulling the back of jig 10 adjacent legs 32 and 38.

Attention is now turned to the various jig elements secured to work surface 30 which are used to receive and assemble the rebar elements described above into a rebar pier cage such as seen in FIG. 2. In particular, first and second channel bar members 50 and 52 are fixedly secured to work surface 30 closely adjacent ( i.e., substantially flush) and traversing the two smaller, opposite edges of the rectangular shaped work surface 30. As seen in the cross-sectional view of FIG. 3, channel bar 50 (of which channel bar 52 is identical) is a rectangular hollow piece having an opening 54 formed in the upwardly facing surface thereof (opposite work surface 30) and which extends the full longitudinal length thereof having a constant width $w_2$.

Third and fourth channel bars 56 and 58 are of the same configuration as bars 50 and 52 having longitudinally extending openings 60 and 62, respectively, formed in the surface thereof directed upwardly away from work surface 30. Bars 56 and 58 slidingly attach in parallel at opposite ends thereof to bars 50 and 52 such that bars 56 and 58 traverse the longitudinal length L of work surface 30 in a direction perpendicular to bars 50 and 52. As seen best in FIG. 3, bars 56 and 58 attach to bars 50 and 52 with a screw-type clamp assembly having female and male connector elements 61 and 63, respectively. Each end of bars 56 and 58 include a circular aperture 64 formed in the surface thereof opposite longitudinal opening 60 wherethrough the threaded rod portion 63' of male connector element 63 extends and exits through opening 60. (It is understood that the structures of the clamp assembly elements and channel bars found at both ends of both bars 56 and 58 are identical).

Figure 3:
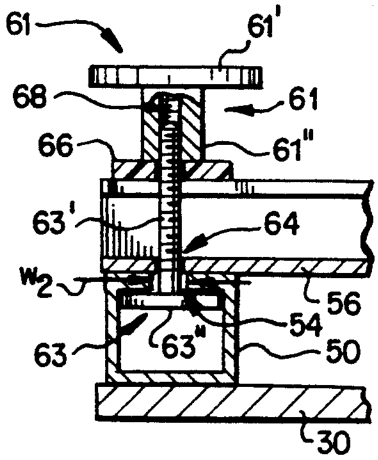
FIG. 3 is a cross-sectional view taken along line 3—3 of FIG. 1 showing the clamping member utilized in the present invention to releasably secure two channel members together.

Thus, as seen in FIG. 3, the flat head 63'' part of male connector element 63 is inserted within the hollow portion of channel bar 50 with threaded rod 63' extending through the longitudinal opening 54. Since the channel bars are open ended, insertion of male connector head 63'' is easily accomplished by inserting it into the channel bar at either end thereof. As aforementioned, channel bar 56 is positioned atop bar 50 with the threaded rod 63' of male connector element 63 passing through aperture 64 and exiting through longitudinal opening 60. A washer 66 is disposed over the exposed, free end of threaded rod 63' followed by securing female connector element 61 thereto. In particular, female connector element 61 includes a flat head 61' with a shaft 61'' extending therefrom having a longitudinally extending, threaded aperture 68 formed therein and wherein threaded rod 63' threadedly engages. Thus, bar 56 may be placed in tight, clamping engagement with bar 50 by tightening female connector element 61 to male connector element 63. Likewise, female and male connector elements 61 and 63 may be loosened whereupon bars 56 and 58 are movable in either lateral direction perpendicular to and with respect to bars 50 and 52. In this way, the lateral distance $D_1$ between bars 56 and 58 (FIG. 4) may be varied in accordance with the particular size of rebar pier cage to be constructed using jig 10, as will be understood more fully below.

Figure 5:
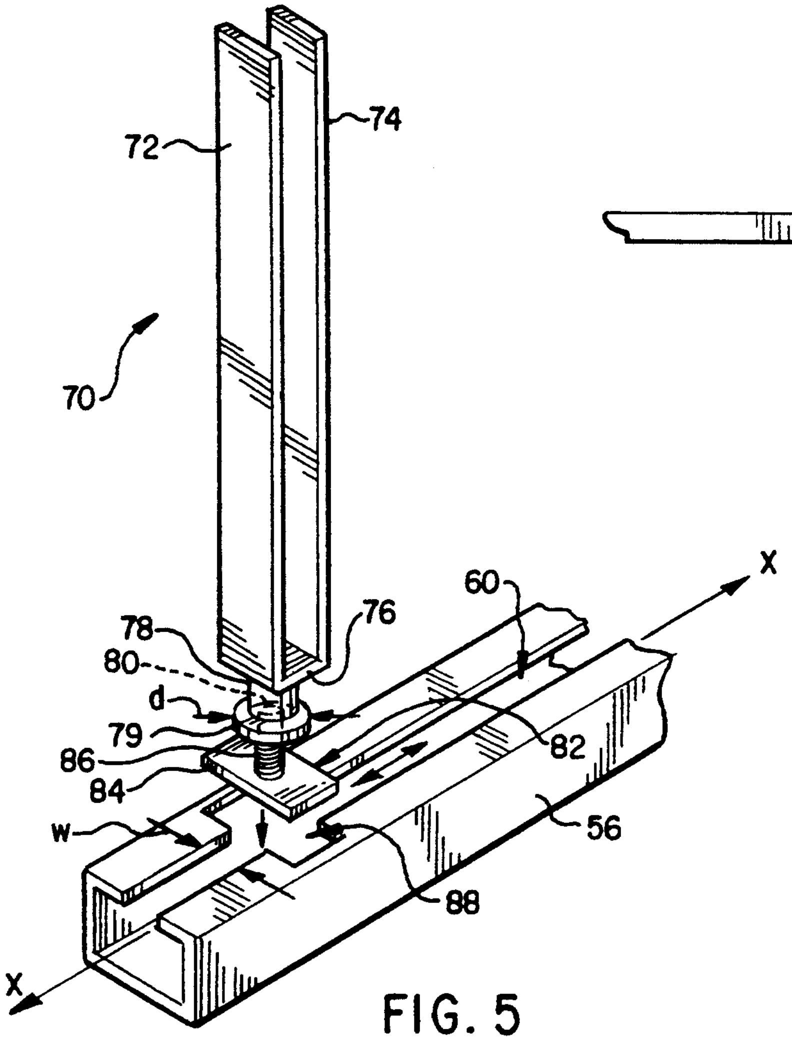
FIG. 5 is a fragmented, perspective view of a stirrup retaining element shown spaced above a rectangular opening formed in one of the two longest channel members.

It is seen that bars 56 and 58 include a plurality of elongated retaining elements 70 removably attached thereto which are used to hold individual stirrups 22 in place during assembly of a pier cage. As seen best in FIG. 5, retaining element 70 comprises an upper, U-shaped portion formed from sheet metal having first and second, elongated legs 72 and 74 which lie in spaced, parallel planes to one another. The base 76 of the U-shaped portion which extends perpendicularly between and interconnects legs 72 and 74 is fixedly mounted to a nut element 78 which includes a longitudinally extending, internal, threaded aperture 80. A male fastening element 82 is provided having a rectangular head portion 84 with a threaded rod portion 86 extending therefrom. Bar 56 (and bar 58 since they are identical as mentioned above) is seen in FIG. 5 to include a rectangular opening 88 formed in the top surface thereof two of which includes longitudinal opening 60, with rectangular opening 88 contiguously formed with longitudinal opening 60.

To insert retaining element 70 within bar 56, male fastening element 82 is threaded a small distance into nut element 78 leaving a maximum distance between rectangular head portion 84 and nut element 78. Rectangular head portion 84 is then inserted into bar 56 through rectangular opening 88 and moved in either direction along the longitudinal axis of bar 56 in accordance with the arrows with threaded rod portion 86 extending upwardly through longitudinal opening 60. The enlarged circular portion 79 of nut element 78 has a diameter d larger than the lateral width w of longitudinal opening 60. As such, retaining element 70 may be releasably secured to bar 56 by rotating retaining element 70 with male fastening element 82 within bar 56 whereupon threaded rod 86 fully engages threaded aperture 80, the surface of bar 56 on either side of longitudinal opening 60 being tightly clamped between rectangular head portion 84 and circular portion 79. In the fully secured position, legs 72 and 74 of retaining element 70 lie in planes which extend perpendicular to the longitudinal axis x—x of bar 56.

Referring back to FIG. 1, and particularly to the method of assembling the rebar pier cage 12 of FIG. 2, a predetermined, equal number of retaining elements 70 are attached and secured to bars 56 and 58 with each retaining element 70 in bar 56 positioned in direct, lateral alignment with a respective retaining element 70 in bar 58. It will be noticed an elongated hanger bar 47 is attached to and extends between table legs 36 and 38 on which extra retaining elements 70 may be suspended. Each laterally aligned pair of retaining elements 70 in bars 56 and 58 may receive and hold a stirrup 22 between legs 72 and 74 thereof with one stirrup 22 shown spaced above a pair of retaining elements 70 and one stirrup 22 shown positioned and held between a pair of retaining elements 70 in FIG. 1 in the intended manner. Since, as mentioned above, legs 72 and 74 lie in planes perpendicular to the longitudinal axis x—x of bar 56, stirrups 22 positioned therebetween also lie in spaced, parallel planes perpendicular to axis x—x.

Figure 4:
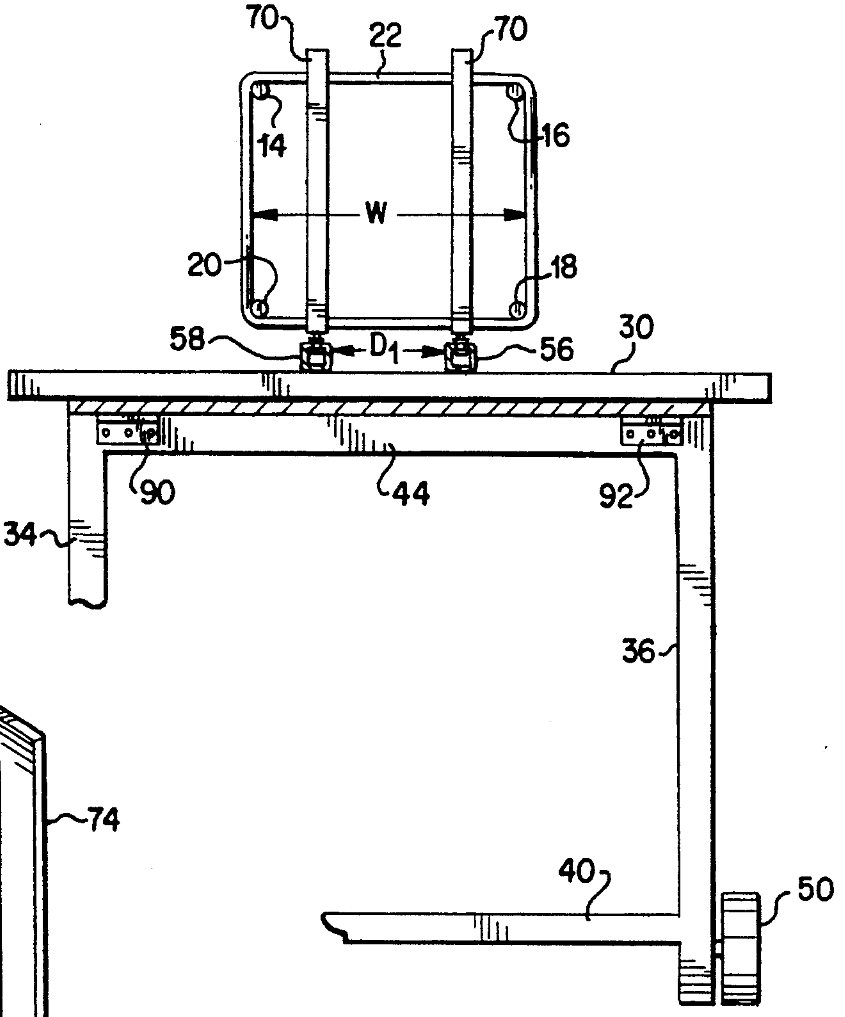
FIG. 4 is a front, elevational view as taken along the line 4—4 in FIG. 1 with a portion of the table broken away.

The size of pier cage needed for a particular application may vary widely, as measured both between successive stirrups and the dimensions of each stirrup themselves. Jig 10 may therefore be adjusted prior to assembly by moving bars 56 and 58 away or towards each other to a predetermined distance $D_1$ in the manner described above to adjust for the width W of the stirrup to be placed therebetween (FIG. 4). The distance $D_1$ between bars 56 and 58 should be smaller than the width W of the stirrup 22 such that the sides of the stirrup extend laterally outwardly beyond bars 56 and 58. Likewise, the longitudinal distance $D_2$ between retaining elements 70 (FIG. 1) on each bar 56 and 58 may be adjusted by moving elements 70 along openings 60 and 62, respectively, by loosening and tightening nut element 78 thereof. This adjustment dictates the distance $D_2$ between each successive stirrup 22 in the fully assembled cage 12 (FIG. 2). In this respect, measuring indicia such as at 71 and 73 (FIGS. 1 and 6, respectively) are affixed to the vertical, outwardly facing surfaces of bars 54 and 56 to quickly and accurately gauge the desired distances between bars 56 and 58 and retaining elements 70, respectively.

Following placement of a stirrup 22 in between each laterally aligned pair of retaining elements 70, two of the four elongated rebars 18 and 20 are slidingly inserted through each stirrup 22 between the sides of the stirrup and a retaining element 70 with rebars 18 and 20 positioned to abut the two lower, inner corners thereof, respectively (FIG. 4 ). The rebars 18 and 20 are then secured to the stirrups 22 by attaching metal tie clasps 24 (FIG. 2) around the rebars 18 and 20 and respective corners of the stirrups as is conventional practice in the art. The remaining two rebars 14 and 16 are slidingly inserted through each of stirrups 22 and positioned immediately adjacent rebars 20 and 18, respectively, with the terminal ends of each pair being lined up. Once lined up, rebars 14 and 16 are lifted directly above rebars 20 and 18, respectively, and positioned to abut the opposite, inside corners of stirrup 22 as seen in FIG. 4. Rebars 14 and 16 are then also secured to stirrups 22 by metal tie clasps 24 being attached thereto at the respective corners of each stirrup 22 in the same manner as were rebars 20 and 18 thereby finishing the assembly of rebar pier cage 12.

Figure 6:
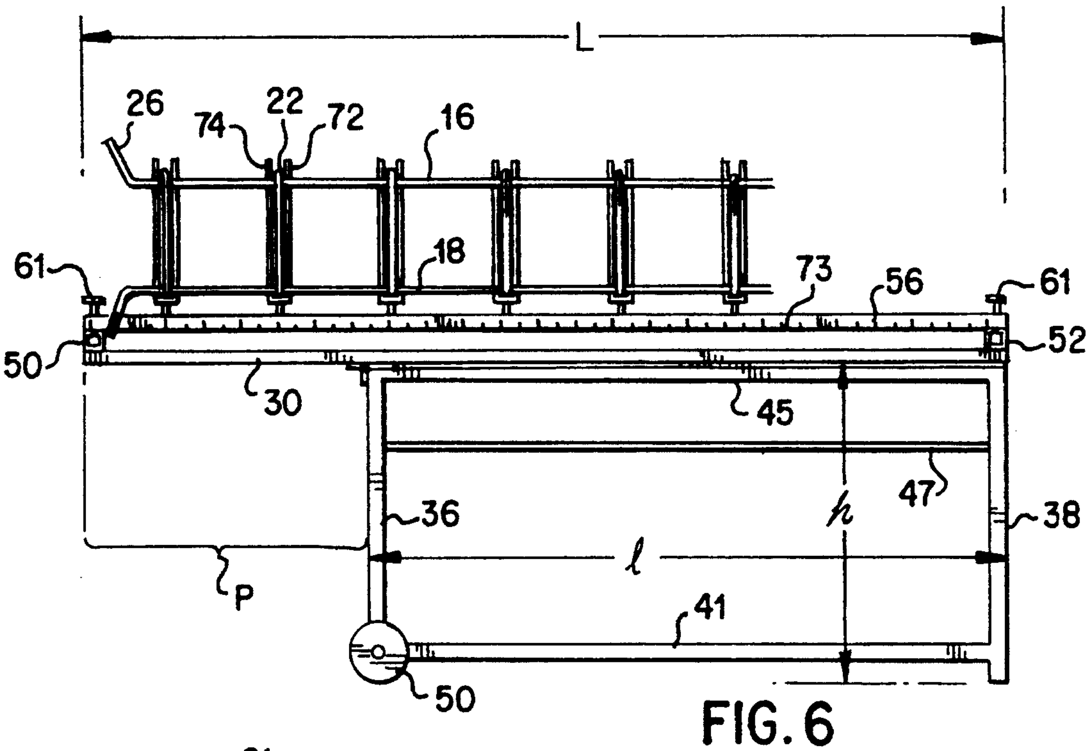
FIG. 6 is a side, elevational view of FIG. 1 and further showing a fully assembled rebar pier cage positioned within the stirrup retaining elements thereof.
Figure 7:
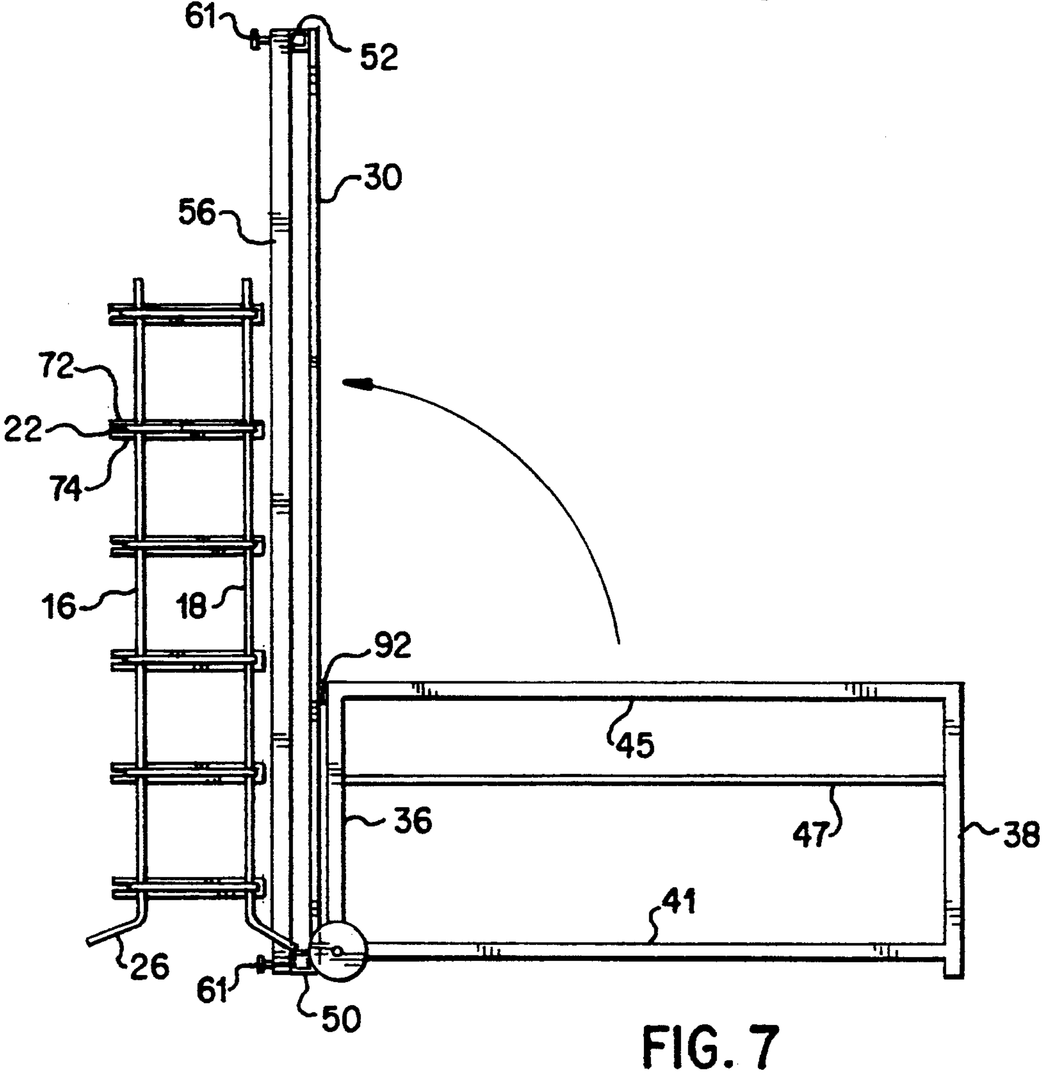
FIG. 7 is the view of FIG. 6 showing the work surface pivoted to its vertical position with respect to the table frame.

As seen best in FIGS. 4, 6 and 7, work surface 30 is hingedly connected to support bar 44 of table frame 28 with hinges 90 and 92 attached thereto adjacent legs 34 and 36, respectively. The overall length L of work surface 30 is substantially equal to the sum of the length l and height h of table 28 with the portion p of work surface 30 extending beyond the front of table 30 being equal to h. With the smaller edge of work surface 30 at the back of the table frame 28 being substantially flush with the back edge of the table frame, work surface 30 may be moved between the horizontal position seen in FIGS. 1, 4 and 6, and the vertical position seen in FIG. 7. This feature allows for quick and easy removal of a fully assembled rebar pier cage 12 from jig 10 where no appreciable lifting is required.

There is thus provided a novel and efficient apparatus and method for quickly assembling rebar pier cages. While the invention has been described with particular reference to a preferred embodiment thereof, it is understood that modifications may be made thereto without departing from the full spirit and scope of the invention as defined by the claims which follow.

What is claimed is:

1. A jig for assembling a rebar pier cage having a plurality of elongated rebars arranged in spaced, parallel relationship and a plurality of rebar stirrups each configured in substantially the same, predetermined polygonal shape defining a central opening said rebar stirrups longitudinally arranged in spaced, parallel planes with said elongated rebars extending through said central opening of each of said second plurality of rebars and secured in abutting relationship thereto with said parallel planes lying perpendicular to the longitudinal axes of said elongated rebars, said jig comprising:

a) a first plurality of stirrup retaining elements positioned and spaced along a first longitudinal axis and configured to removably receive and hold a respective plurality of said rebar stirrups in said spaced, parallel planes with portions of said rebar stirrups extending laterally beyond either side of said stirrup retaining elements;

b) a second plurality of stirrup retaining elements positioned and spaced along a second longitudinal axis which lies spaced and parallel to said first longitudinal axis, each of said second plurality of stirrup retaining elements positioned in direct lateral alignment with a respective one of said first plurality of stirrup retaining elements with each laterally adjacent pair of said first and second plurality of retaining elements configured to removably receive and hold one of said rebar stirrups in said spaced, parallel planes with portions of said rebar stirrups extending laterally beyond each of said laterally adjacent pairs of rebar stirrups;

c) first and second, elongated channel bars having top, bottom and side surfaces lying along said first and second longitudinal axes, respectively, said first and second channel bars including first and second, longitudinally extending openings having a constant width w traversing said top surfaces thereof, respectively;

d) a fastening element attached to each of said stirrup retaining elements, said fastening element manually operable to removably engage portions of said top surface of one of said first and second channel bars adjacent said respective longitudinally extending opening, said fastening element comprising:

i) a cylindrical female connector element fixedly attached to the surface of said base portion facing in a direction away from said first and second legs, said female connector element having a longitudinally extending, threaded aperture which extends along an axis running parallel to and approximately midway between said spaced, parallel planes along which said first and second legs lie, said female connector element further including a circular flange extending around the terminal periphery thereof opposite said base portion with said flange having a diameter d which is larger than said constant width $w_1$ of said longitudinally extending openings of said first and second channel bars; and ii) male connector element removably connected to said female connector element, said male connector element comprising a substantially planar head portion of predetermined outline with a threaded shaft fixedly attached thereto and extending therefrom in a direction substantially normal to said planar head portion, said threaded shaft of said male portion being removably threadedly engaged in said threaded aperture of said female connector element with said head portion of said male connector element and said circular flange of said female connector element clampingly engaging said portions of said top surface of said one of said first and second channel bars adjacent said respective longitudinally extending opening; and e) said stirrup retaining elements each including first and second, elongated planar legs lying in spaced, parallel planes and having a base portion interconnecting said first and second legs, said first and second legs of each of said stirrup retaining elements lying in planes extending substantially perpendicular to said first and second longitudinal axes upon removably securing said stirrup retaining elements to said first and second elongated channel bars, respectively.

2. A jig for assembling a rebar pier cage having a plurality of elongated rebars arranged in spaced, parallel relationship and a plurality of rebar stirrups each configured in substantially the same, predetermined polygonal shape defining a central opening said rebar stirrups longitudinally arranged in spaced, parallel planes with said elongated rebars extending through said central opening of each of said second plurality of rebars and secured in abutting relationship thereto with said parallel planes lying perpendicular to the longitudinal axes of said elongated rebars, said jig comprising:

a) first plurality of stirrup retaining elements positioned and spaced along a first longitudinal axis and configured to removably receive and hold a respective plurality of said rebar stirrups in said spaced, parallel planes with portions of said rebar stirrups extending laterally beyond either side of said stirrup retaining elements;

b) a second plurality of stirrup retaining elements positioned and spaced along a second longitudinal axis which lies spaced and parallel to said first longitudinal axis, each of said second plurality of stirrup retaining elements positioned in direct lateral alignment with a respective one of said first plurality of stirrup retaining elements with each laterally adjacent pair of said first and second plurality of retaining elements configured to removably receive and hold one of said rebar stirrups in said spaced, parallel planes with portions of said rebar stirrups extending laterally beyond each of said laterally adjacent pairs of rebar stirrups;

c) first and second, elongated channel bars each having first and second ends with top, bottom and opposite side surfaces lying along said first and second longitudinal axes, respectively, and to which said first and second plurality of stirrup retaining elements attach, said first and second channel bars including first and second, longitudinally extending openings traversing said top surfaces thereof, respectively;

d) third and fourth, elongated channel bars extending parallel to each other and perpendicular to said first and second channel bars adjacent said first and second ends thereof, respectively, said third and fourth elongated channel bars each having first and second ends with top, bottom and opposite side surfaces with a longitudinally extending opening of constant width $w_2$ traversing said top surfaces of each of said third and fourth channel bars;

e) a clamping assembly releasably clamping said first and second ends of said first and second channel bar members to said third and fourth channel bars adjacent said longitudinal openings thereof; and f) said first, second, third and fourth channel bar members being hollow and said first and second channel bar members including an aperture adjacent said first and second ends thereof in said bottom surfaces thereof opposite said longitudinal opening and wherein said clamping assembly comprises:

i) a male connector element having a head portion and a threaded shaft extending perpendicularly therefrom, said head portion being larger than said constant width $w_2$ of said longitudinal opening of said third and fourth channel bars and positioned within said third and fourth channel bars with said threaded shaft extending through said respective longitudinal opening thereof, said bottom surfaces of said first and second channel bar members at said first and second ends thereof lying in covering relation to said top surfaces of said third and fourth channel bar members and said threaded shaft extending consecutively through said aperture in said bottom surface of said first and second channel bar members, the terminal end of said threaded shaft opposite said head portion extending through said longitudinal opening of said first and second channel bar members; and ii) a female connector element having a head portion and a cylindrical nut portion extending therefrom including a longitudinally extending, threaded aperture formed therein and wherein said terminal end of said threaded shaft is threadedly inserted.

3. The invention according to claim 2 wherein said jig further comprises a planar work surface of substantially rectangular configuration having first and second, opposite shorter edges with said third and fourth elongated channel bars being fixedly secured to said planar work surface in traversing, adjacent relationship to said first and second, opposite shorter edges, respectively, and said first and second channel bar members traversing said planar work surface from said first to said second shorter edge thereof.

4. The invention according to claim 3 and further comprising a table frame attached to said planar work surface and having floor engaging legs supporting said planar work surface a predetermined distance above said floor.

5. The invention according to claim 4 and further comprising pivotal attachment means interconnecting said planar work surface and said table frame such that said planar work surface is manually movable about said table frame between a substantially horizontal position with respect to said floor, and a substantially vertical position with respect to said floor.

6. The invention according to claim 5 wherein said table frame is of rectangular configuration and includes four of said floor engaging legs having top and bottom ends with each of said legs interconnected at said top and bottom ends thereof by four upper and four lower, horizontally extending support bars, respectively, and wherein said planar work surface is of a length L which is substantially equal to the sum of the corresponding length and height of said table frame, and wherein one of said smaller edges of said planar work surface lies substantially flush with a smaller one of said upper support bars such that a portion p of said planar work surface which equals said height of said table frame extends beyond said table frame, and wherein said pivotal attachment means comprises a pair of hinges interconnecting said table frame to said planar work surface at the point where said portion p extends beyond said table frame.

7. The invention according to claim 6 and further comprising a pair of floor engaging casters attached to said bottom ends of at least two of said four legs.

8. A jig for assembling a rebar pier cage having a plurality of elongated rebars arranged in spaced, parallel relationship and a plurality of rebar stirrups each configured in substantially the same, predetermined polygonal shape defining a central opening said rebar stirrups longitudinally arranged in spaced, parallel planes with said elongated rebars extending through said central opening of each of said second plurality of rebars and secured in abutting relationship thereto with said parallel planes lying perpendicular to the longitudinal axes of said elongated rebars, said jig comprising:

a) a first plurality of stirrup retaining elements positioned and spaced along a first longitudinal axis and configured to removably receive and hold a respective plurality of said rebar stirrups in said spaced, parallel planes with portions of said rebar stirrups extending laterally beyond either side of said stirrup retaining elements;

b) a second plurality of stirrup retaining elements positioned and spaced along a second longitudinal axis which lies spaced and parallel to said first longitudinal axis, each of said second plurality of stirrup retaining elements positioned in direct lateral alignment with a respective one of said first plurality of stirrup retaining elements with each laterally adjacent pair of said first and second plurality of retaining elements configured to removably receive and hold one of said rebar stirrups in said spaced, parallel planes with portions of said rebar stirrups extending laterally beyond each of said laterally adjacent pairs of rebar stirrups;

c) means to selectively adjust the lateral spacing between said first and second longitudinal axes along which said first and second plurality of stirrup retaining elements lie, respectively;

d) first and second, elongated channel bars having top, bottom and side surfaces lying along said first and second longitudinal axes, respectively, said first and second channel bars including first and second, longitudinally extending openings having a constant width w traversing said top surfaces thereof, respectively;

e) a fastening element attached to each of said stirrup retaining elements, said fastening element manually operable to removably engage portions of said top surface of one of said first and second channel bars adjacent said respective longitudinally extending opening;

f) said stirrup retaining elements each including first and second, elongated planar legs lying in spaced, parallel planes and having a base portion interconnecting said first and second legs, said first and second legs of each of said stirrup retaining elements lying in planes extending substantially perpendicular to said first and second longitudinal axes upon removably securing said stirrup retaining elements to said first and second elongated channel bars, respectively; and g) said fastening element comprising:

i) a cylindrical female connector element fixedly attached to the surface of said base portion facing in a direction away from said first and second legs, said female connector element having a longitudinally extending, threaded aperture which extends along an axis running parallel to and approximately midway between said spaced, parallel planes along which said first and second legs lie, said female connector element further including a circular flange extending around the terminal periphery thereof opposite said base portion with said flange having a diameter d which is larger than said constant width $w_1$ of said longitudinally extending openings of said first and second channel bars; and ii) a male connector element removably connected to said female connector element, said male connector element comprising a substantially planar head portion of predetermined outline with a threaded shaft fixedly attached thereto and extending therefrom in a direction substantially normal to said planar head portion, said threaded shaft of said male portion being removably threadedly engaged in said threaded aperture of said female connector element with said head portion of said male connector element and said circular flange of said female connector element clampingly engaging said portions of said top surface of said one of said first and second channel bars adjacent said respective longitudinally extending opening.

9. The invention according to claim 8 wherein said jig further comprises first and second, elongated channel bars each having first and second ends with top, bottom and opposite side surfaces lying along said first and second longitudinal axes, respectively, and to which said first and second plurality of stirrup retaining elements attach, said first and second channel bars including first and second, longitudinally extending openings traversing said top surfaces thereof, respectively, and wherein said means to selectively adjust the lateral spacing between said first and second longitudinal axis comprises:

a) third and fourth, elongated channel bars extending parallel to each other and perpendicular to said first and second channel bars adjacent said first and second ends thereof, respectively, said third and fourth elongated channel bars each having first and second ends with top, bottom and opposite side surfaces with a longitudinally extending opening of constant width $w_2$ traversing said top surfaces of each of said third and fourth channel bars; and b) a clamping assembly releasably clamping said first and second ends of said first and second channel bar members to said third and fourth channel bars adjacent said longitudinal openings thereof.

10. The invention according to claim 9 wherein said first, second, third and fourth channel bar members are hollow and wherein said first and second channel bar members include an aperture at said first and second ends thereof in said bottom surfaces thereof opposite said longitudinal opening and wherein said clamping assembly comprises:

a) a male connector element having a head portion and a threaded shaft extending perpendicularly therefrom, said head portion being larger than said constant width $w_2$ of said longitudinal opening of said third and fourth channel bars and positioned within said third and fourth channel bars with said threaded shaft extending through said respective longitudinal opening thereof, said bottom surfaces of said first and second channel bar members at said first and second ends thereof lying in covering relation to said top surfaces of said third and fourth channel bar members and said threaded shaft extending consecutively through said aperture in said bottom surface of said first and second channel bar members, the terminal end of said threaded shaft opposite said head portion extending through said longitudinal opening of said first and second channel bar members; and b) a female connector element having a head portion and a cylindrical nut portion extending therefrom including a longitudinally extending, threaded aperture formed therein and wherein said terminal end of said threaded shaft is threadedly inserted.

11. The invention according to claim 10 wherein said jig further comprises a planar work surface of substantially rectangular configuration having first and second, opposite shorter edges with said third and fourth elongated channel bars being fixedly secured to said planar work surface in traversing, adjacent relationship to said first and second, opposite shorter edges, respectively, and said first and second channel bar members traversing said planar work surface from said first to said second shorter edge thereof.

12. The invention according to claim 11 further comprising a table frame attached to said planar work surface and having floor engaging legs supporting said planar work surface a predetermined distance above said floor.

13. The invention according to claim 12 and further comprising pivotal attachment means interconnecting said planar work surface and said table frame such that said planar work surface is manually movable about said table frame between a substantially horizontal position with respect to said floor, and a substantially vertical position with respect to said floor.

14. The invention according to claim 13 wherein said table frame is of rectangular configuration and includes four of said floor engaging legs having top and bottom ends with each of said legs interconnected at said top and bottom ends thereof by four upper and four lower, horizontally extending support bars, respectively, and wherein said planar work surface is of a length L which is substantially equal to the sum of the corresponding length and height of said table frame, and wherein one of said smaller edges of said planar work surface lies substantially flush with a smaller one of said upper support bars such that a portion p of said planar work surface which equals said height of said table frame extends beyond said table frame, and wherein said pivotal attachment means comprises a pair of hinges interconnecting said table frame to said planar work surface at the point where said portion p extends beyond said table frame.

15. The invention according to claim 14 and further comprising a pair of floor engaging casters attached to said bottom ends of at least two of said four legs.

* * * * *